United States Patent
Yablochnikov

(10) Patent No.: US 6,891,137 B2
(45) Date of Patent: *May 10, 2005

(54) METHOD OF MAGNETIC PULSE WELDING AN END FITTING TO A DRIVESHAFT TUBE OF A VEHICULAR DRIVESHAFT

(75) Inventor: Boris A. Yablochnikov, Toledo, OH (US)

(73) Assignee: Torque-Traction Technologies, Inc., Maumee, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/796,264

(22) Filed: Mar. 9, 2004

(65) Prior Publication Data

US 2004/0173661 A1 Sep. 9, 2004

Related U.S. Application Data

(60) Continuation of application No. 10/387,107, filed on Mar. 11, 2003, now Pat. No. 6,703,594, which is a continuation of application No. 10/136,949, filed on Apr. 30, 2002, now Pat. No. 6,531,688, which is a continuation of application No. 09/346,366, filed on Jul. 1, 1999, now Pat. No. 6,379,254, which is a division of application No. 08/880,177, filed on Jun. 20, 1997, now Pat. No. 5,981,921.

(51) Int. Cl.[7] ................................. H05B 6/10
(52) U.S. Cl. ..................... 219/603; 219/611; 29/419.2; 72/56
(58) Field of Search ................. 219/603, 611, 219/607, 608, 617; 29/419.2, 432, 505, 518–519, 432.1, 432.2; 72/56; 228/107

(56) References Cited

U.S. PATENT DOCUMENTS 2,341,084 A   2/1944  Dodge
2,478,890 A   8/1949  Barager (Continued)

FOREIGN PATENT DOCUMENTS

DE   2 728 306    1/1978
FR   1 200 466   12/1959
FR   2 450 145    9/1980

OTHER PUBLICATIONS

Yablochnikov, B., "Apparatus for Magnetic Pulse Welding Large Diameter Thin–Walled Pipes", AVT. Svarka, No. 4, pp. 48–51, 58, 1983.

Kojima et al., "Effect of Collision Angle on the Result of Electromagnetic Welding of Aluminum", Transactions of the Japan Welding Society, vol. 20, No. 2, pp. 36–42, Oct., 1989.

Karpouhin et al., "Magnetic Pulse Welding", International Conference on the Joining of Materials, Helsingor, Denmark, pp. 241–245, May, 1991.

Hardwick et al., "Some More Recent Advances in Cladding Technology", Ninth Annual Conference on High Energy Reaction on Materials, Novosibirsk, Russia, pp. 271–274, Aug., 1986.

Noland et al., "High–Velocity Metal Working", Office of Technology Utilization, NASA, Washington, D.C., pp. 1–29, 179, 1967.

*Primary Examiner*—Philip H. Leung
(74) *Attorney, Agent, or Firm*—MacMillan, Sobanski & Todd, LLC

(57) ABSTRACT

A method for securing components of a vehicular driveshaft includes disposing a neck of an end fitting into the open end of a driveshaft tube. The end fitting is held with respect to the driveshaft tube so that an annular gap is formed between the neck and the driveshaft tube. An inductor is provided about the driveshaft tube adjacent the end receiving the neck. The inductor is energized to generate a magnetic field for collapsing the driveshaft tube about the neck at a high velocity so that the driveshaft tube and the end fitting are welded to each other.

12 Claims, 9 Drawing Sheets

U.S. PATENT DOCUMENTS

| | | |
|---|---|---|
| 3,092,165 A | 6/1963 | Harvey |
| 3,214,511 A | 10/1965 | Franklin |
| 3,417,456 A | 12/1968 | Carlson |
| 3,520,049 A | 7/1970 | Lysenko et al. |
| 3,528,596 A | 9/1970 | Carlson |
| 3,961,739 A | 6/1976 | Leftheris |
| 3,992,120 A | 11/1976 | Recker |
| 4,067,216 A | 1/1978 | Khimenko et al. |
| 4,129,846 A | 12/1978 | Yablochnikov |
| 4,469,356 A | 9/1984 | Duret et al. |
| 4,504,714 A | 3/1985 | Katzenstein |
| 4,513,188 A | 4/1985 | Katzenstein |
| 4,523,872 A | 6/1985 | Arena |
| 4,551,118 A | 11/1985 | Spisz |
| 4,702,543 A | 10/1987 | Hager |
| 4,789,094 A | 12/1988 | Chudakov |
| 4,807,351 A | 2/1989 | Berg et al. |
| 4,930,204 A | 6/1990 | Schurter |
| 4,990,732 A | 2/1991 | Dudko et al. |
| 5,222,915 A | 6/1993 | Petrzelka et al. |
| 5,318,374 A | 6/1994 | Rumberger |
| 5,716,276 A | 2/1998 | Mangas et al. |
| 5,813,264 A | 9/1998 | Steingroever |
| 5,981,921 A | 11/1999 | Yablochnikov |
| 2002/0003159 A1 | 1/2002 | Gabbianelli et al. |

METHOD OF MAGNETIC PULSE WELDING AN END FITTING TO A DRIVESHAFT TUBE OF A VEHICULAR DRIVESHAFT

CROSS REFERENCE TO RELATED APPLICATIONS

This application is a continuation of application Ser. No. 10/387,107, filed Mar. 11, 2003, now U.S. Pat. No. 6,703,594, issued Mar. 9, 2004, which was a continuation of application Ser. No. 10/136,949, filed Apr. 30, 2002, now U.S. Pat. No. 6,531,688, issued Mar. 11, 2003, which was a continuation of application Ser. No. 09/346,366 filed Jul, 1, 1999, now U.S. Pat. No. 6,379,254 issued Apr. 30, 2002, which was a division of Ser. No. 08/880,177 filed Jun. 20, 1997, now U.S. Pat. No. 5,981,921, issued Nov. 9, 1999.

BACKGROUND OF THE INVENTION

The present invention relates generally to a method of fabricating automotive driveshafts and more specifically, to a method of attaching metal end-fittings such as an automotive U-joint yoke and splined tube shaft to tubular shafts which rotate at speeds and transmit torque and axial forces such as when in use as a vehicle driveshaft In general, a vehicular driveshaft transmits torque from a transmission to an axle to drive selected wheels of a vehicle. A driveshaft operates through changing relative angles between the transmission and the axle. Furthermore, a driveshaft expands and contracts in response to road conditions when the vehicle is operated. To accomplish these functions, driveshafts include well known universal joints and slip joints connected to driveshaft tubes.

A driveshaft tube includes a hollow cylindrical portion of a desired length, oftentimes terminating at one end in a tube yoke. The tube yoke includes a pair of opposed arms for receiving bearing cups mounted on trunnions of a cross. The tube yoke, cross and bearing can be combined with an end yoke to form a universal joint. The opposite end of the driveshaft tube can terminate in a splined tube shaft designed to receive an end yoke. The opposite end of the driveshaft tube can also terminate in a second tube yoke. Tube yokes and driveshaft tubes are conventionally formed from steel and are attached to the driveshaft tube by conventional welding processes.

In order to reduce vehicular weight, obtain smooth operation and improve fuel economy, driveshaft components have been formed from lighter materials such as aluminum. Pure aluminum does not make driveshaft components of acceptable strength, but alloys of aluminum have adequate strength. While aluminum alloys have been an acceptable material because of their strength and lighter weight, problems have been experienced using conventional welding techniques with such components. For example, aluminum components have been weakened by heat generated and transferred to them during conventional welding.

For the attachment of end-fittings to metal tubes, many other techniques are available with varying degree of success. Among these other methods are the use of pins, rivets, bolts, adhesives and such mechanical methods as splines, keyways, polygon matching shapes, shrink fits and press fits. However, these attachment methods are not as economical as desired, particularly when applied to driveshafts of vehicles.

In use today, with limited success, is one recent innovation known under the trademark MAGNAFORM. This technology employs a very high electromagnetic-induced force to swage aluminum tube onto a fitting, as is commonly used for non-driveshaft applications. Unfortunately, the results of such a method for attaching end fittings to driveshaft tubes have been less than satisfactory. Magnetic forming requires a non-circular, force-transmitting shape to transmit torque between two rotating parts. Aluminum, which is typically used in driveshafts, is a notch sensitive material, and is subject to cracking where it is stressed by being deformed into shapes having relatively large contours. Also, when torque is applied to the driveshaft in the vehicle, there is a small amount of slippage between the yoke and the driveshaft tube which produces a loud and irritating sound. This has resulted in a large number of consumer complaints. Besides that, magnetic pulse forming gives good mechanical strength results only as long as the torque is not too high. But with a high level of torque, as measured with fatigue tests, the life of the driveshaft is reduced considerably.

A large number of revisions have been made in order to attempt to solve those problems. Unfortunately, all of these have been unsatisfactory. There is therefore a need to provide a solution which permits the advantageous use of magnetic pulse fields for swaging a tube and the advantageous use of the welding process for joining the end-fitting and the aluminum driveshaft tube.

A known prior art method of pressure welding is based on the use of interaction of magnetic fields, produced by an inductor through which an impulse of high intensity current is passed. The parts to be welded are positioned in spaced relation at an angle therebetween and the method can be used for obtaining overlapping welded joints of thin-walled parts having different thickness and made from different materials without melting. This is described in U.S. Pat. No. 3,520,049, to Lysenko et al. This method is referred to gas Magnetic Pulse Welding (MDW) and has been used in particular to weld the end of nuclear fuel rods and has also found application in other contexts in which the diameters of the parts to be joined are small (about 25 mm) and tubes made from mechanical strength metal. Diameters of parts to be welded can be larger (about 60 mm) if tubes are made from technically pure aluminum and have a wall thickness of about 1.5 mm.

The apparatus for MPW as used today in manufacturing has the same basic design as the apparatus for magnetic pulse forming. The main parts of each apparatus are a capacitor bank, inductor and high current switching device. The technological capability of conventional MPW apparatus is much less than what is necessary for magnetic pulse welding of driveshafts having tube diameter within the range of about 75 to 180 mm and wall thickness of 2 to 3 mm. Further, conventional MPW apparatus is not capable of magnetic pulse welding of end fittings with driveshafts made from high-strength aluminum alloys like 6061T.

An improvement in welding tubular parts of large diameter using MPW is described by Yablochnikov in "Apparatus for MPW Large Diameter, Thin-Walled Pipes"; Avt. Svarka, 1983, No. 4 pp. 48–51, 58. That apparatus, named the Arc Magnetic Pulse Equipment (AMPE) has two main features: first, using a special type of inductor and, second, using a special vacuum switch which has closely-spaced ring-like electrodes that are positioned close to the inductor. Between the electrodes there are insulators and a metallic housing. The contact surfaces of the insulators, the metallic housing and the electrodes are hermetically sealed to create a closed discharge chamber which is evacuated by a vacuum pump. Due to those features and extra-low inductance of the system connection bus bars, AMPE has minimal loss of energy in the process of discharge.

In principle, AMPE should permit tubes as large as a driveshaft to be welded using MPW, but there appear four problems which must be solved before this technology can become valuable from a manufacturing point of view. The first problem is the destruction and contamination of insulation elements of inductor by the powerful cumulative jet which flows axially along the welding surfaces (i.e., axially of the driveshaft tube) during the welding process. This cumulative jet is produced in the process of collision welding of metal when the impact velocity is high enough. The second problem is the low strength of the welding joint between high-strength aluminum alloy tubes and the end fitting if the latter is made from steel. The third problem is the possibility of premature breakdown of the vacuum switch. And the fourth problem is a long cycle time and resulting low productivity of AMPE. The last two problems are connected and contradictory to each other.

In the process of MPW welding, the surfaces of metal approach each other at an angle and collide with high relative velocity. The welding surfaces usually have oxide films and contaminants. To get a strong joint or weld, it is necessary to clean this contamination from the welding surfaces. In the process of MPW in the area where the surfaces collide with each other at high velocity, the cumulative jet includes material from the surface sheets and contaminants from the collision surfaces. This material carried with the cumulative jet acts to clean the welding surfaces.

The cumulative jet has supersonic velocity and creates a loud sound like thunder if allowed to escape to the atmosphere. If the cumulative jet is restrained, and reflected from obstacles such as the shoulder of the end fitting or the surfaces of tooling, and directed toward the insulation elements of inductor, then the cumulative jet can create problems. In such a case, the insulation elements can be contaminated and can be destroyed within a short number (perhaps less than 100) of welding cycles. Obviously this is unacceptable in a manufacturing process because breakdown of the inductor is possible.

As a result of the problems described above, welding using MPW has not yet been found to produce high quality welding joints between driveshaft tubes and end fittings if the driveshaft tubes are made from high-strength aluminum alloys like 6061 and any related temper, and the end fittings are made from middle carbonic steel like EMS-40. The physical reason for this is not known yet. But it is highly desirable in the manufacture of driveshafts to find a method to allow MPW of aluminum driveshaft tubes with split fitting because those fittings can only be made from steel.

The problem of eliminating the aforementioned self breakdown of the switch is a basic problem in the technique of high pulse current and strong magnetic fields. This problem becomes especially complicated if the amplitude of the current achieves a level of one mega-ampere or more, if the energy of the pulse is 40 kilojoules or more, if the charge transfer is 10 coulombs or more, and if the frequency of pulses more than one per minute.

Any high current switch must be able to withstand the working voltage of the capacitor bank without spontaneous breakdown. The switch should also have low inductance and inherent resistance. Further, the switch should have sufficient current throughput capacity, charge transfer and long service life. Depending on the actual conditions, to these main requirements are added others such as ease of linkage with the other components of the discharge circuit, quiet running, and a sufficiently narrow interval between discharge cycles. For magnetic pulse welding of a driveshaft, it is especially important to have such properties as a working switch with a narrow interval between discharge cycles and without spontaneous breakdown—contradictory requirements, especially for vacuum switches. The reason for the first of these properties (narrow interval) is the necessity to achieve highly productive output for driveshaft. The reason for the second (without spontaneous breakdown) is the impossibility of repairing the driveshaft in case of failure of the welding operation. This is a critical difference between the processes of magnetic pulse forming and magnetic pulse welding. The failure of the magnetic pulse forming operation can be corrected by using repetition of the discharge pulse. But the failure of the magnetic pulse welding operation cannot be corrected by using repetition of the discharge pulse because the first pulse changes or eliminates the gap between the welded surfaces, the value of which is very critical for the success of the MPW process. Failure of MPW results in an irrecoverably useless driveshaft tube. It is obvious that a long service life is also necessary for MPW driveshaft under manufacturing conditions.

For welding driveshafts using MPW only two types of inductor can be used. The first has a massive high-strength single-turn coil, the disadvantage of which is a gap between the leads, resulting in a nonuniform magnetic force field, and thereby providing a non-uniform weld. The other, preferred type of inductor has high strength coil comprised of a number of generally flat, closely packed but spaced-apart, nearly circular or annular electrical conductor strips, as disclosed in U.S. Pat. No. 4,129,846 to Yablochnikov. This type of coil provides a uniformly azimuthal distribution of the magnetic field and is used in the conventional AMPE process. To weld driveshafts using MPW, both types of inductors demand very high currents (1 to 2 mega amperes and higher) and a high energy of pulse (40 to 60 kilojoule and more).

The higher the amplitude of the current and the higher the energy of the pulse, the more complicated become the problems of switching that current's pulse. This problem becomes more and more complicated if the pulse current must be repeated with short intervals, as is necessary in an economical manufacturing process. The best results in switching the pulse current for a conventional AMPE process is a vacuum switch. It provides 2.0 to 2.5 current discharges in a minute, but this is not enough for economical manufacturing of driveshafts. The productivity must be at least 2 to 3 times higher.

The vacuum switch used in conventional AMPE has a gap between the electrodes of about 5 mm and is ready to switch if the residual pressure in the discharge chamber is lowered to about 10 to 20 Pascals. In this area of physical characteristics, the voltage of self breakdown of the switch increases inversely proportionally to the value of the residual pressure within the chamber as the pressure is being reduced. Unfortunately, this relation is true only if intervacuum surfaces of insulation elements are clean. But in the process of each switching step, the conditions on these surfaces are changing. High current discharge is accompanied by very intensive processes of electric erosion of electrodes and insulators. The products of erosion include vapors and small drops of metal from the electrodes. As a result of the deposition of these products of erosion on the elements of the vacuum switch, the switch is not capable of blocking the voltage developed across the capacitor bank if the charging starts too early.

The reason that it is difficult to maintain a switch at a high level of cleanliness to avoid premature discharge is as follows. After each discharge of the stored energy from the capacitor bank the gaseous mixture from the vacuum chamber of the switch is evacuated by the vacuum pump. However, part of the metallic vapors and drops are deposited on surfaces of the insulators, and over time they form a coating on various insulating elements, and this consequently decreases the insulating properties. A complete understanding of the sophisticated physical processes inside the discharge chambers of the vacuum switches is not known, especially when the amplitude of the current reaches millions of amperes. But experiments found that a good vacuum in the discharge chamber is not sufficient by itself to prevent premature discharge.

During a welding cycle, the time required for recovery of the insulation properties of the intervacuum insulation and the time for charging the capacitor bank takes 80 to 90 percent of the entire working cycle of AMPE, which is typically 25 to 30 seconds. An additional disadvantage of the AMPE is that there is no guarantee that each cycle will work properly because a self breakdown is possible. A known solution to the problems of productivity and reliability of AMPE consists of separating the capacitor bank from the discharge circuit by means of special disconnectors after each switching during the time of pumping of the discharge chamber, and also measuring the breakdown voltage between electrodes. The processes of pumping the chamber and charging the capacitor bank can take place simultaneously. After achieving the breakdown and charging the voltages as necessary, the disconnectors are closed and switching can be done. The disadvantages of this solution are the sophisticated and large size required for the disconnectors. Also, a special hydraulic system controlled by the disconnectors is required if the design is based on a mechanical principle, and the use of mercury is required if the design is based on a liquid-metallic principle.

There is therefore a need to provide a solution which permits use of MPW for joining the various elements of driveshaft assemblies to each other, including attaching an aluminum driveshaft tube to an end fitting made of the same or different metals. This system should provide high productivity and reliability, and should avoid the complex design of the AMPE. Such a system should weld aluminum components of a vehicular driveshaft in such a manner so as not to damage the integrity or strength of the components or the final assembly.

SUMMARY OF THE INVENTION

This invention relates to a method for securing components of vehicular driveshafts. This method utilizes an electromagnetic field to force one component into another at a very high velocity, thereby causing the components to be welded to one another upon impact. This method welds the components together with a magnetic pulse welding process without the risk of damage from heat found in conventional welding techniques.

According to this invention, a method of securing components of a vehicular driveshaft assembly includes providing a driveshaft tube having an open end, providing an end fitting having a neck, disposing the neck of the end fitting into the open end of the driveshaft tube so that an annular gap is provided between the neck and the driveshaft tube, providing an inductor around the driveshaft tube adjacent the end receiving the neck, and energizing the inductor to generate a magnetic field for collapsing the driveshaft tube about the neck at a velocity sufficient to magnetic pulse weld the driveshaft tube and end fitting to each other.

In another embodiment of the invention, a method of joining an end fitting and a driveshaft tube of a vehicular driveshaft assembly includes providing a hollow driveshaft tube having an open first end, the driveshaft tube having an inner surface defined by a first inner diameter, providing a tubular sleeve having an outer surface defined by a second diameter smaller than the first diameter and an inner surface defined by a third diameter smaller than the second diameter, providing an end fitting having a neck with an outer surface defined by a fourth diameter smaller than the third diameter, providing an electrical inductor, disposing the neck of the end fitting into the tubular sleeve so that a first annular gap is formed between the neck and the tubular sleeve, disposing the sleeve into the open end of the driveshaft tube so that a second annular gap is formed between the tubular sleeve and the driveshaft tube, disposing the first end of the driveshaft tube containing the sleeve and neck into the inductor, and energizing the inductor to generate electromagnetic forces to collapse the driveshaft tube onto the tubular sleeve and the tubular sleeve onto the neck at a high velocity, thereby welding the driveshaft tube is to the sleeve and the tubular sleeve to the neck.

In another embodiment of the invention, the method of joining an end fitting and a driveshaft tube of a driveshaft assembly includes welding with magnetic pulse welding a generally tubular sleeve of transition material to the outer surface of a neck of an end fitting, reducing the thickness of the transition material, and welding a hollow driveshaft tube to the transition material using magnetic pulse welding to join the driveshaft tube to the end fitting.

In another embodiment of the invention, an end fitting suitable for being joined to a driveshaft tube of a driveshaft assembly by means of electromagnetic pulse welding is provided. The welding process generates contaminants traveling along the end fitting, and the end fitting includes a welding surface suitable for being welded to the driveshaft tube by magnetic pulse welding, and a pocket for providing a collection location for the contaminants.

In another embodiment of the invention, an end fitting suitable for being joined to a driveshaft tube of a driveshaft assembly by means of electromagnetic pulse welding includes a neck positioned on the end fitting, the neck having a welding surface suitable for being joined to the driveshaft tube by welding and a slot positioned in the neck of the end fitting to provide increased flexibility to the neck of the end fitting during operation of the driveshaft.

In another embodiment of the invention, a method of securing components of a driveshaft assembly includes providing a driveshaft tube having an open end, providing an end fitting having a neck, where the neck has a frustoconical surface and a shoulder, thereby defining a cavity, disposing the neck of the end fitting into the open end of the driveshaft tube so that an annular gap is provided between the neck and the driveshaft tube, with the end of the driveshaft tube being generally axially aligned with the shoulder, providing a shield to block the emission of contaminants escaping from the cavity along the shoulder, and welding the driveshaft tube to the end fitting.

In another embodiment of the invention, a method of securing components of a driveshaft assembly using magnetic pulse welding apparatus includes progressively evacuating the gases surrounding the discharge switch, where the evacuation progressively increases the voltage at which the discharge switch will self breakdown, charging the capacitor at a rate which maintains the voltage of the capacitor at a level below the self breakdown voltage of the discharge switch, and discharging the capacitor through the discharge switch after the voltage reaches a predetermined voltage.

In another embodiment of the invention, a method of securing components of a driveshaft assembly using magnetic pulse welding apparatus includes assembling the driveshaft and end fitting in preparation for welding them together, charging the capacitor to a voltage equal to a predetermined threshold level, inserting the assembled driveshaft and end fitting into the inductor coil after the voltage of the capacitor has reached the predetermined level, and welding the assembled driveshaft and end fitting into a driveshaft assembly.

Various objects and advantages of this invention will become apparent to those skilled in the art from the following detailed description of the preferred embodiment, when read in light of the accompanying drawings.

DETAILED DESCRIPTION OF THE PREFERRED EMBODIMENT

Figure 1:
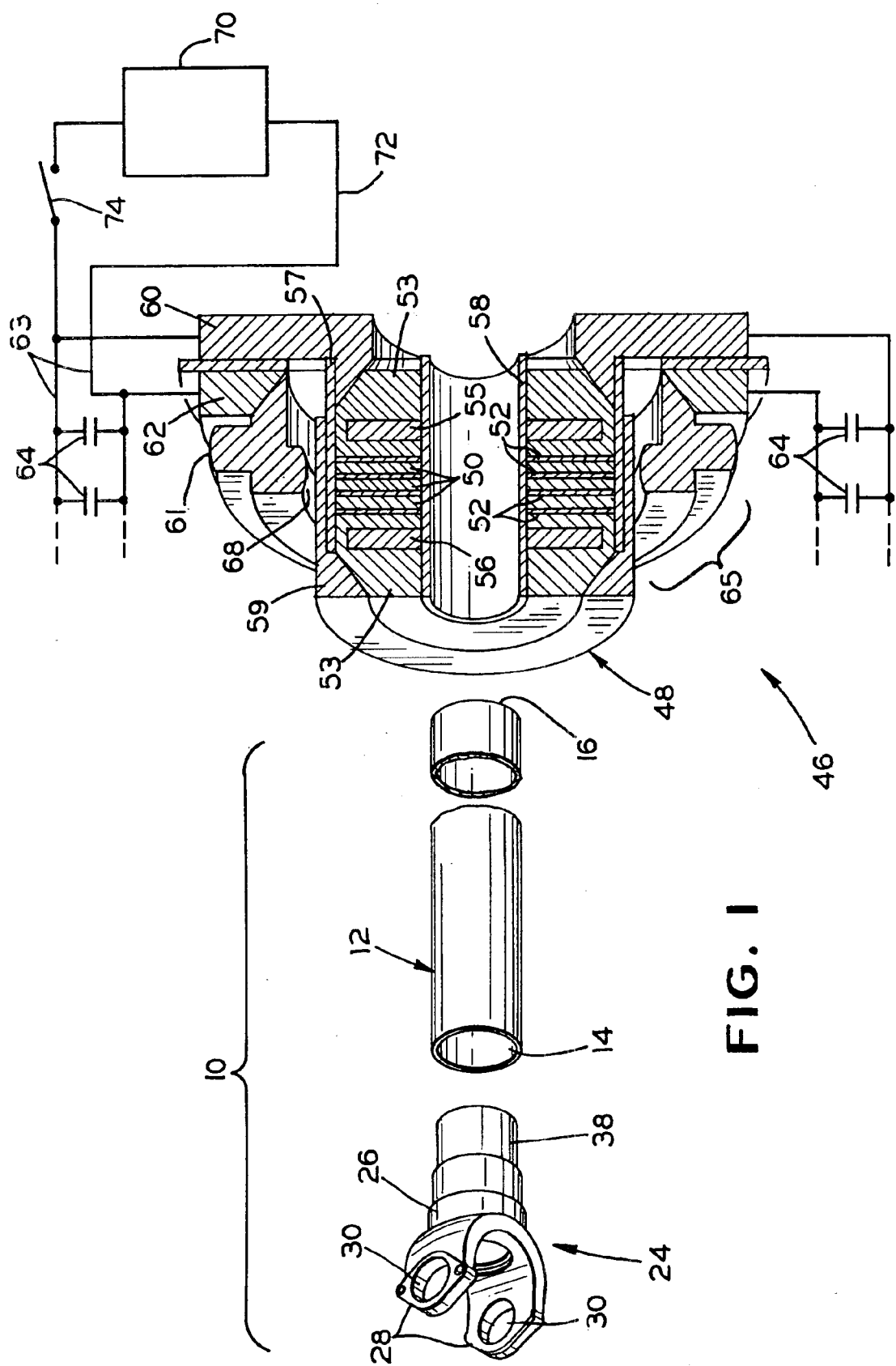
FIG. 1 is an exploded perspective view of an end fitting and driveshaft tube prior to welding the end fitting to the driveshaft using an inductor pursuant to the method of the present invention.

Now referring to the drawings, there is illustrated in FIG. 1 selected parts of a vehicular driveshaft assembly, indicated generally at 10. A predetermined length of a driveshaft tube 12 is a hollow cylindrical member having at least a first open end 14. In the illustrated embodiment, driveshaft tube 12 is illustrated with a second open end 16. However, in other embodiments, the driveshaft tube 12 can include a midship tube shaft (not illustrated) or slip tube shaft (not illustrated) or other member secured at the second end 16.

Figure 2:
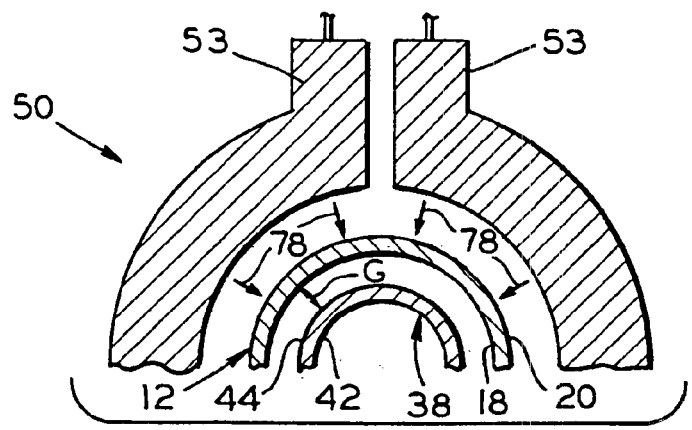
FIG. 2 is a partial sectional view of the end fitting, driveshaft tube and conductor strip of FIG. 1 after the end fitting has been inserted into the driveshaft tube and the driveshaft tube has been disposed within the inductor, illustrating the forces of a magnetic field created by the welding method of the present invention.

Preferably, the driveshaft tube 12 has a substantially constant inner diameter defining an inner surface 18 and a substantially constant outer diameter defining an outer surface 20, as shown in FIG. 2, thereby producing a driveshaft tube 12 of uniform thickness. The driveshaft tube 12 can be formed from any suitable material, such as aluminum, and in particular strong aluminum alloys, such as 6061T aluminum alloy. Another possibly suitable material is titanium alloys.

An end fitting, in the form of tube yoke 24, is provided. Although the embodiment shown illustrates a tube yoke 24 as the end fitting, it is to be understood that any other type of end fitting desired to be secured to the open end 14 of the driveshaft tube 12 can be used. The tube yoke 24 has a body portion 26 having a pair of spaced-apart, opposed arms 28 extending therefrom. Each of the opposed arms 28 has a cylindrical opening 30 formed therethrough which receives a respective bearing cup 32, shown in FIG. 6, rotatably mounted on a universal joint cross 34, also shown in FIG. 6. The tube yoke 24, cross 34 and an end yoke 36 cooperate to form a well known universal joint in a vehicular driveshaft. The tube yoke 24 can be formed from any suitable material, including aluminum and steel.

Figure 8:
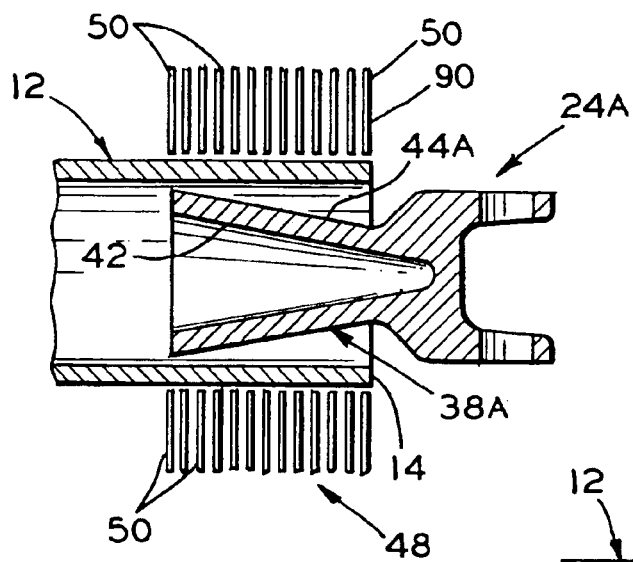
FIG. 8 is a schematic cross-sectional view in elevation of the drive shaft, end fitting and a preferred inductor coil of the invention, with the end fitting having a single tapered outer surface.

Tubular neck 38 extends from the body portion 26 opposite the arms 28. The neck 38 can have inner and outer surfaces of various shapes. As shown in FIG. 8, the neck 38 has a varying inner diameter defining a tapered inner surface 42 and a varying outer diameter defining a tapered outer surface 44. Other surface configurations include cylindrical, twin tapered convex and twin tapered concave, as will be explained below.

The present invention includes a method for securing the end fitting, illustrated as a tube yoke 24, to the driveshaft tube 12. The neck 38 of the tube yoke 24 and the driveshaft tube 12 are sized so that an annular gap G exists between the outer surface 44 of the neck 38 and the inner surface 18 of the driveshaft tube 12 when the neck 38 is inserted into the open first end 14, as shown in FIG. 2. Preferably the gap G is substantially uniform at every circumferential location around the neck of the tube yoke. When the neck 38 is inserted into the open end 14 of the driveshaft tube 12 as illustrated in FIG. 2, a generally loose fit occurs. For purposes of clarity of illustration, the annular gap G created by the loose fit has been exaggerated in the drawings. The tube yoke 24 and the driveshaft tube 12 can be held in position by a suitable locator fixture (not shown in FIG. 1, but shown in FIG. 13 and described in detail below) so that the gap G is substantially uniform. Preferably, the gap G for tube yokes having cylindrical outer surfaces has a relatively large radial span, typically within the range of from about 0.5 to about 5 mm, and preferably within the range of from about 1 to about 3 mm. For tube yokes having non-cylindrical outer surfaces, the gap will vary between about zero and about 5 mm.

An inductor 46 is provided about, and preferably radially spaced from, the outer surface 20 of the driveshaft tube 12 adjacent the first end 14. The inductor includes an inductor coil. For magnetic pulse welding driveshaft tubes, which typically have diameters within the range of from about 7.5 to about 18 cm, only two types of inductor coil can be used. The first is a massive high-strength single-turn coil, not shown. The single turn inductor is disadvantageous in that it has a gap or spacing between the ends or leads, resulting in a nonuniform magnetic force field surrounding the driveshaft, and thereby providing a non-uniform weld.

The other, preferred type of coil is a high strength coil 48 comprised of plurality of generally flat, closely packed, but spaced-apart, nearly circular or annular electrical conductor strips 50, shown in FIG. 1. The conductor strips 50 can be helically bent at a pitch which insures a displacement of the ends or leads of the conductor strips relative to each other. Insulators 52 are positioned between adjacent conductor strips 50. Preferably, the inductor 46 is similar to that disclosed in U.S. Pat. No. 4,129,846 to Yablochnikov, which hereby incorporated by reference. The preferred multiple conductor strip coil 48 shown in FIG. 1 is preferable over a conventional single-turn coil because it provides a uniformly azimuthal distribution of the magnetic field.

The inductor 46 includes leads or terminals 53 which provide an electrical connection to the inductor coil 48. Additional insulation is provided by insulators 55, 56 and 57. Central insulator 58 is positioned in the inside diameter of the inductor 46. One of the terminals 53 is supplied with current via the first switch connector or electrode 59, and the other of the terminals 53 is connected to the source of current by a first bus bar 60. Similarly, the second electrode 61 is connected to the source of current by a second bus bar 62.

The inductor 46 is connected via discharge circuit 63 to high voltage capacitors 64. Although only two capacitors 64 are shown, any number of capacitors can be used. The current required for successful welding of aluminum tubes and yokes suitable for use as vehicle driveshafts is on the order of at least several hundred thousand amps, and possibly as high as one million amps or more. Therefore the discharge circuit must be suitable for conducting a current of great magnitude. The discharge circuit 63 includes a discharge switch 65 which when activated allows the capacitors to discharge and supply an energy spike or surge to the inductor 46. The inductor 46 creates a strong magnetic field that exerts a force against the outer surface 20 of the driveshaft tube 12, as will be explained in further detail below. The switch 65 must be suitable for handling the high currents involved in the discharge circuit 63. The switch 65 can be any suitable means for opening and closing the discharge circuit. A preferred switch is as shown in FIG. 1, where the ring-like or circular conductor or first electrode 59 is positioned close to the second electrode 61, with a gap 68 of about 5 mm between them. The use of ring-like or circular electrodes 59 and 61 for the switch 65 enables the current to flow through the discharge circuit 63 without significant losses, thereby greatly increasing the capacity or power of the magnetic pulse welding apparatus of the invention. Such high current switches are known in the art.

During charging of the capacitors 64, the voltage builds up across the gap 68. To prevent premature discharge across the gap, a vacuum or partial vacuum is placed over the gap, by vacuum means, not shown, so that there will be no arcing across the switch 65. For example, a partial vacuum of about 10 to 20 Pa can be placed over the gap 68. When desired, this partial vacuum can be interrupted by any means, such as a spark plug, not shown, to initiate discharge of the current through the inductor 46. The current will arc across the gap 68 and create a momentary discharge pulse traveling through the discharge circuit 63. The capacitors 64 can be in the form of a single capacitor, or preferably a battery of capacitors arranged in parallel circuits, as shown in FIG. 1. The capacitors preferably have a working voltage of at least several thousand volts. Capacitors having low inductance are preferred.

The battery of capacitors 64 is connected to a source of electrical power, such as power source 70, via a charging circuit 72. Ideally, the power source and capacitors will be sized to allow a rapid buildup of the charge in the capacitors, thereby shortening the period or cycle time for each magnetic pulse welding operation. During the step when the current is arcing across the gap 68 and the discharge circuit-is closed, the charging circuit is preferably disconnected from or insulated from the power source. This can be accomplished by a switch 74 in the charging circuit 72.

Figure 3:
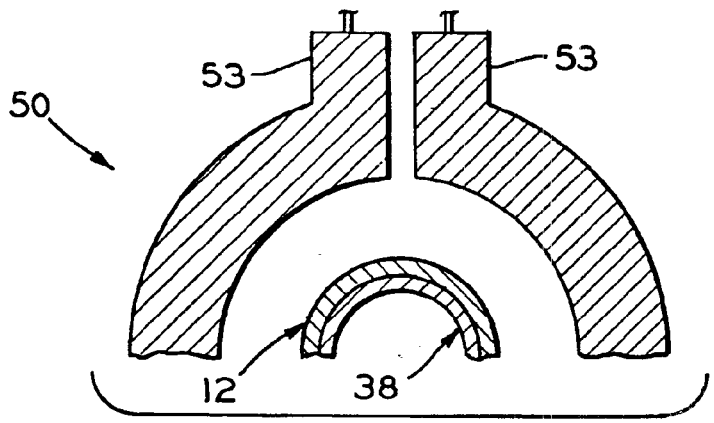
FIG. 3 is a partial sectional view of the end fitting, driveshaft tube and inductor of FIG. 2 after the welding method of the present invention is complete.

The effect of the intense, momentary magnetic field on the metallic driveshaft 12 is to create an extremely powerful force which repels or drives away the driveshaft, radially inwardly from the inductor 46. The magnetic field created by the pulse of current through the inductor creates strong reactive eddy currents in the aluminum driveshaft tube 12. These eddy currents create opposing magnetic fields which result in inwardly directed forces on the metallic driveshaft, as indicated by arrows 78 in FIG. 2. These forces cause the driveshaft tube 12 to collapse about the neck 38 which such an impact that the driveshaft is welded to the neck 38, as shown in FIG. 3.

The sizes and shapes of the neck 38 of the tube yoke 24 and the driveshaft 12, the size and shape of the inductor 46, and the strength and shape of the electromagnetic field are all factors determining the strength of the weld. By maintaining a relatively large annular gap G between the driveshaft tube 12 and the neck 38, the collapsing portion of the driveshaft tube 12 is permitted to accelerate to a relatively high velocity. The high impact velocity causes the inner surface 18 of the driveshaft tube 12 to become welded to the outer surface 44 of the neck 38 when they contact each other, as illustrated in FIG. 3.

The velocity of the driveshaft tube 12 when it comes into contact with the outer surface 44 of the neck 38 of the end yoke is preferably at least 300 meters per second, and more preferably within the range of from about 300 to about 400 meters per second. In contrast to the generally known method of metallic forming, sometimes referred to as a magnetic forming process, the electric pulse welding process of the invention propels the metallic work piece toward the tube yoke with a velocity sufficient to weld the driveshaft 12 to the neck of the tube yoke 24. It can be appreciated that the impact velocity of the driveshaft into contact with the neck of the tube yoke is not only a function of the magnetic driving force created by the inductor 46, but also is a function of the gap or distance G between the driveshaft tube 12 and the neck 38 of the tube yoke 24.

Another factor to be taken into consideration when considering the physical layout of the magnetic pulse welding apparatus is the fact that the driveshaft 12 must respond to the magnetic field by deforming or shrinking to close the gap and allow the driveshaft to come into contact with the tube yoke. However, the driveshaft 12 will resist deformation. Where the gap is too large this resistance to inward deformation may decrease the velocity of the impact of the driveshaft into the tube yoke 24 and thereby prevent the establishment of a satisfactory weld. An even more important limitation is the fact that the electromagnetic field established by the coil 50 has a gradient and weakens as the driveshaft wall moves radially inwardly, away from the inductor coil 50. Therefore, a balance must be struck between the desire for a relatively large gap 68 to increase the impact speed, and a need for a narrow gap to maximize the force from the electromagnetic field and to minimize the forces counteracting the deformation of the driveshaft.

In operation, the power source 70 charges the capacitors 64. The charging circuit is closed and the discharge circuit is open during the charging of the capacitors. When the voltage across the gap 68 increases to the desired discharge level, the switch 65 is closed, and the current arcs across the gap 68 to cause a current to flow in the discharge circuit 63. The charging circuit is open and the discharge circuit is closed during the discharging of the capacitors. The current running through the inductor 46 establishes a strong magnetic field, which causes a rapid inward repulsion of the driveshaft 12 toward the neck 38 of the end yoke 24. The gap G between the driveshaft 12 and the neck 38 of the end yoke 24 is a distance suitable to enable a sufficient impact velocity to cause a permanent welding of the driveshaft 12 to the neck 38 of the end yoke 24.

The magnetic pulse welding method of the invention enables the welding of relatively large driveshafts and tube yokes. For example, driveshafts having outside diameters within the range of from about 7.5 to about 18 cm can be welded using the method of the invention, although typical driveshaft sizes are around 10 cm. Successful welding of the end fitting to the driveshaft means that upon applying torque between the end fitting and the driveshaft, the driveshaft fails before the weld fails.

Figure 4:
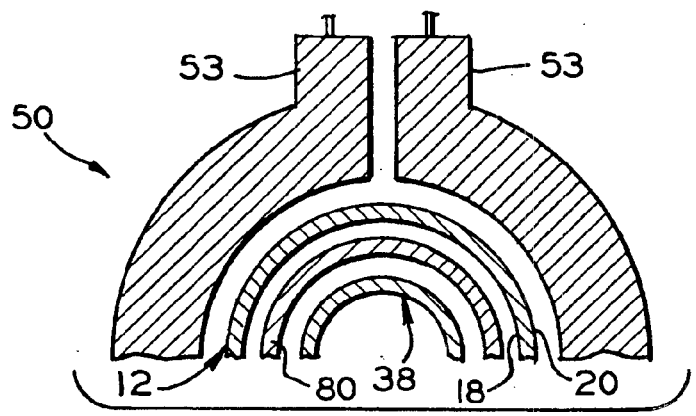
FIG. 4 is a partial sectional view of an end fitting, a cylindrical sleeve, driveshaft tube and an inductor illustrating the forces generated by the magnetic field created during the welding method of the present invention.
Figure 5:
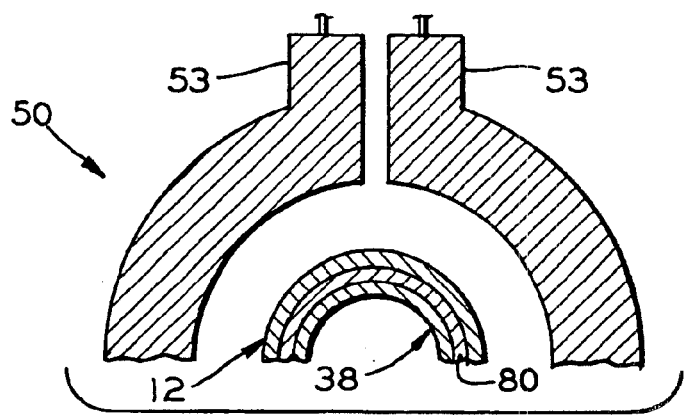
FIG. 5 is a partial sectional view of the end fitting, cylindrical sleeve, driveshaft tube and inductor of FIG. 4 after the welding method of the present invention is complete.

The above-described method of magnetic pulse welding is suitable when the material used to form the driveshaft tube 12 is the same as the material used to form the end fitting. In other instances, it may be desirable to form the driveshaft tube 12 from a first material, such as a high strength aluminum alloy, and the end fitting from a second material, such as steel. In such an instance, a hollow cylindrical sleeve 80 of a transition material such as 1100 series aluminum, may be disposed between the inner surface 18 of the driveshaft tube 12 and the outer surface 44 of the neck 38, as illustrated in FIG. 4. A first substantially uniform annular gap G1 is maintained between the driveshaft tube 12 and the sleeve 80, and a second substantially uniform annular gap G2 is maintained between the sleeve 80 and the neck 38. Preferably, for end fittings having cylindrical outer surfaces gaps G1 and G2 have a relatively large radial spans, typically within the range of from about 1 and 3 mm. Preferably, gaps G1 and G2 are substantially uniform at every circumferential location around the sleeve 80.

Figure 13:
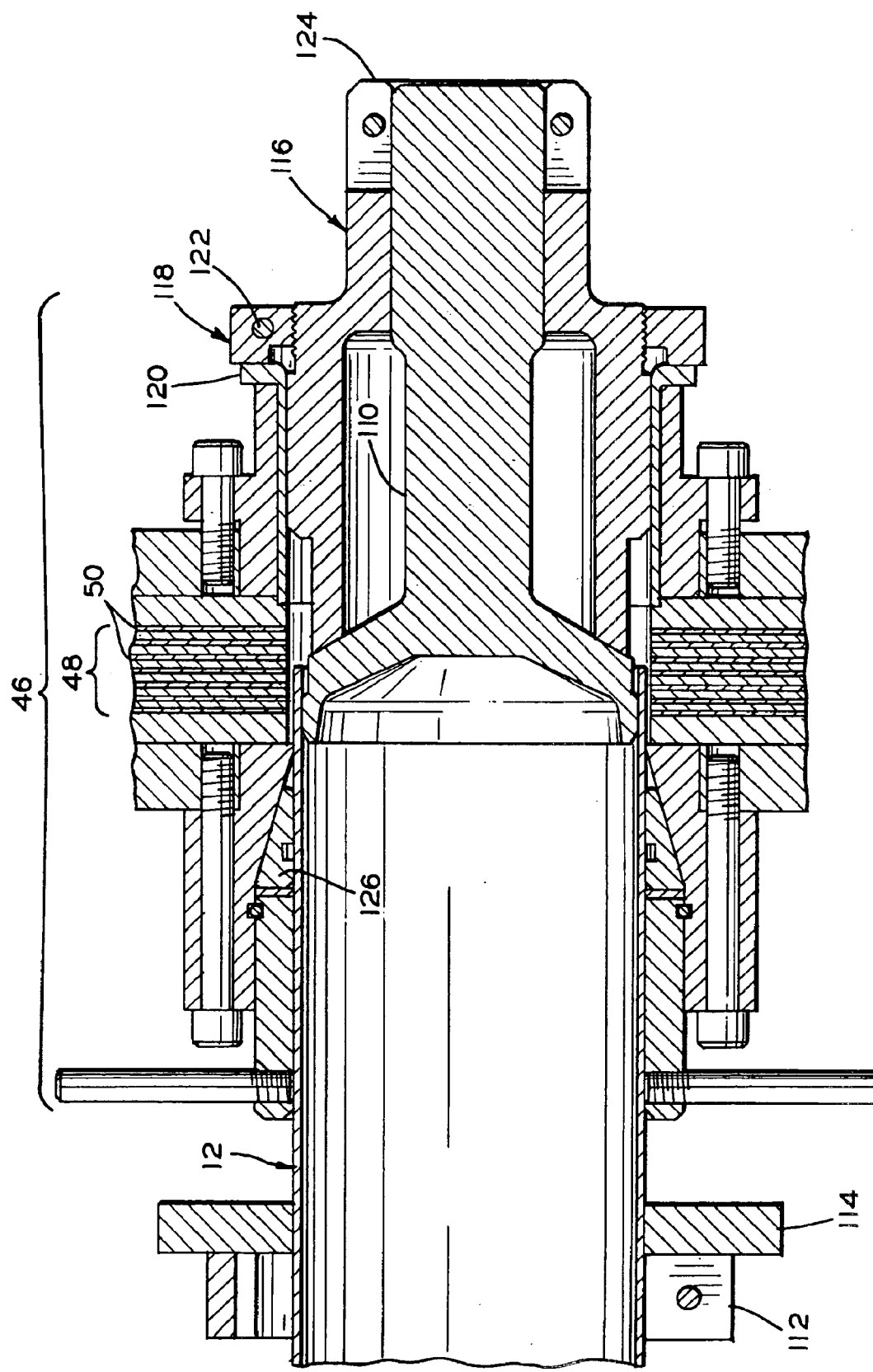
FIG. 13 is a schematic cross-sectional view in elevation of another embodiment of the drive shaft the inductor and the end fitting, illustrating the locating fixtures.

When the driveshaft tube 12, sleeve 80 and neck 38 are held in desired positions by locator fittings, shown in FIG. 13, and subjected to the magnetic force of the inductor 46, the adjacent surfaces are collapsed under relatively high velocity so that welding occurs at both interfaces to secure the driveshaft tube 12 to the sleeve 80, and the sleeve 80 to the neck 38 of the end fitting, illustrated as a tube yoke 24. In a manner similar to the illustration of the annular gap G in FIG. 2, annular gaps G1 and G2 in FIG. 4 have been exaggerated to illustrate the loose fits between the driveshaft tube 12 and the sleeve 80, and between the sleeve 80 and the neck 38.

Figure 6:
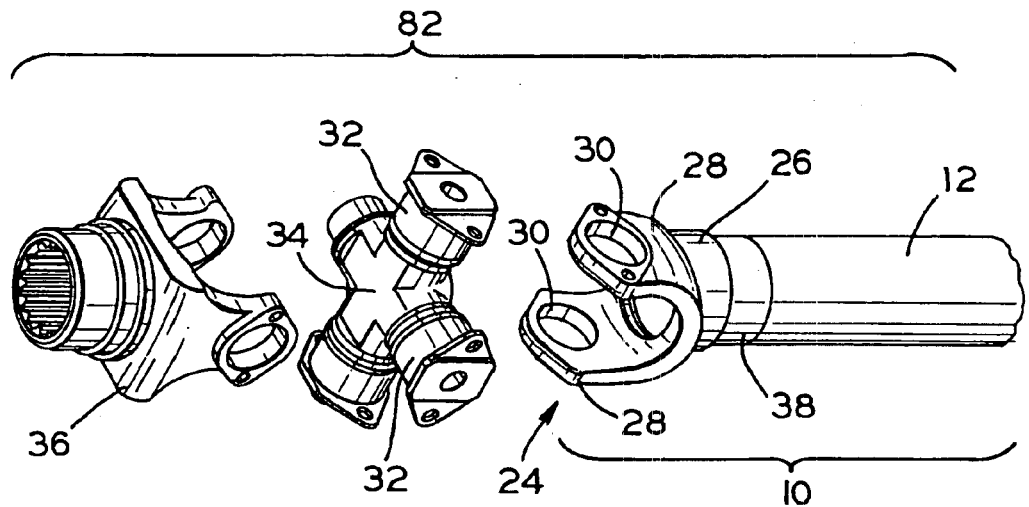
FIG. 6 is a schematic exploded view of a universal joint connected to a driveshaft tube according to the method of invention.
Figure 7:
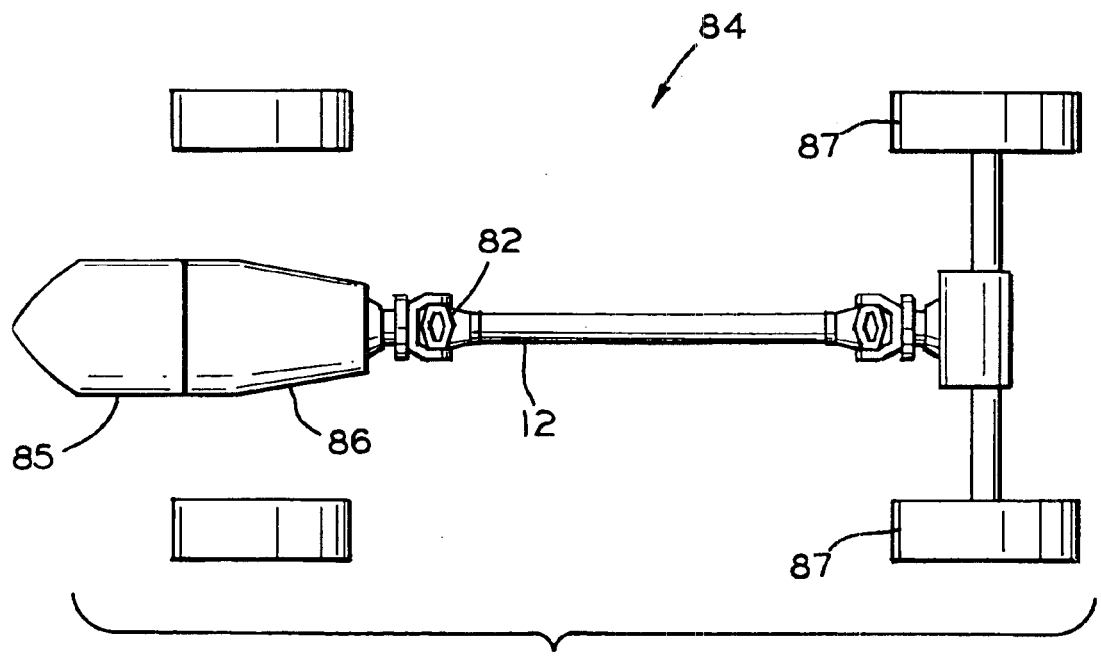
FIG. 7 is a schematic plan view of a vehicle containing a universal joint and driveshaft tube made according to the method of the invention.

As shown in FIGS. 6 and 7, after the tube yoke is welded to the driveshaft 12, the end yoke 36 and the cross 34 can be connected with the tube yoke 24 to form a universal joint 82. The universal joint 82 can be used in transmitting torque in a vehicle 84, as shown in FIG. 7. The engine 85 supplies power to the transmission 86, which provides rotative force to the rear wheels 87 via universal joint 82 and driveshaft 12.

Figure 9:
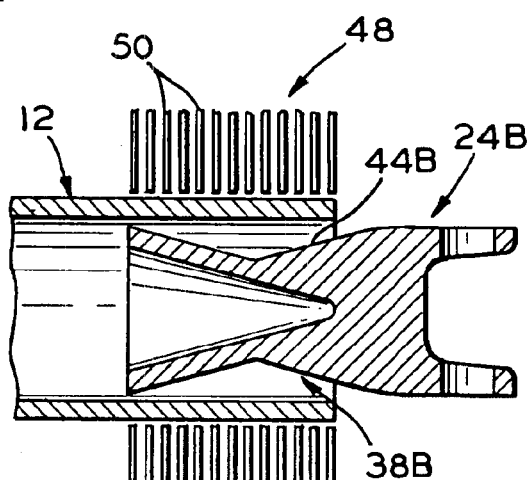
FIG. 9 is a view similar to that of FIG. 8, but with the end fitting having a twin tapered concave outer surface.
Figure 10:
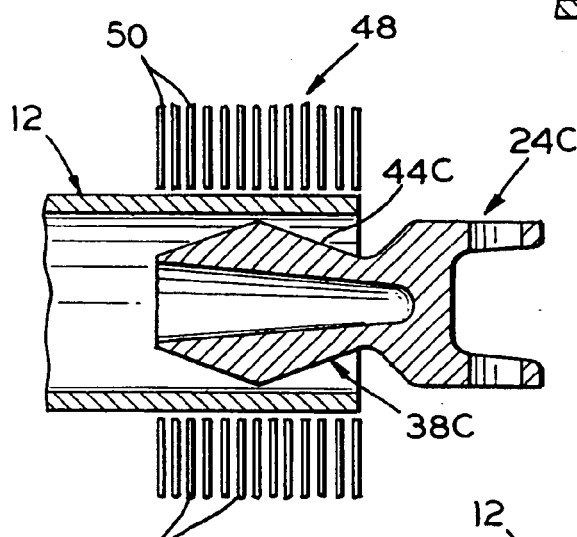
FIG. 10 is a view similar to that of FIG. 8, but with the end fitting having a twin tapered convex outer surface.

As shown in FIGS. 8–11, the outer surface of the end fitting 24 need not be cylindrical, but rather can have different configurations. FIG. 8 illustrates an end fitting 24A having a tube yoke neck 38A with a tapered inner surface 42 and tapered outer surface 44A. In FIG. 9, the outer surface 44B of the tube yoke neck 38B of end fitting 24B has a concave twin tapered shape. The outer surface 44C of FIG. 10 is illustrated as a twin tapered convex surface 44C for the tube yoke neck 38C of end fitting 24C. Also, in FIG. 11, the outer surface 44D of the tube yoke neck 38D of end fitting 24D has a generally cylindrical shape.

Figure 11:
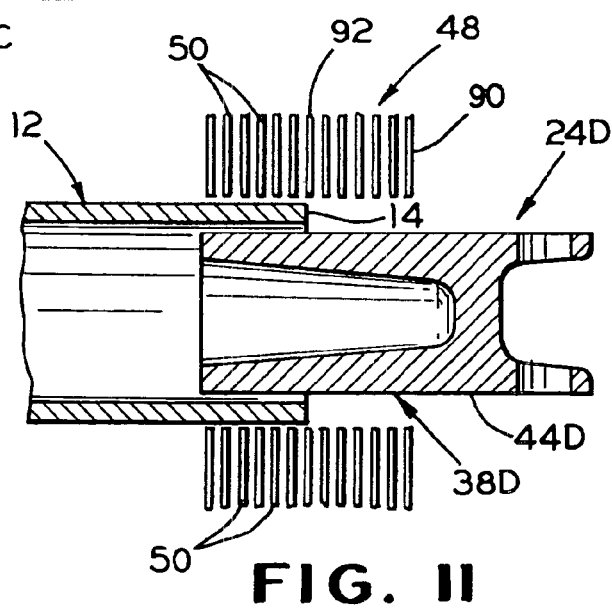
FIG. 11 is a view similar to that of FIG. 8, but with the end fitting having a cylindrical outer surface.
Figure 12:
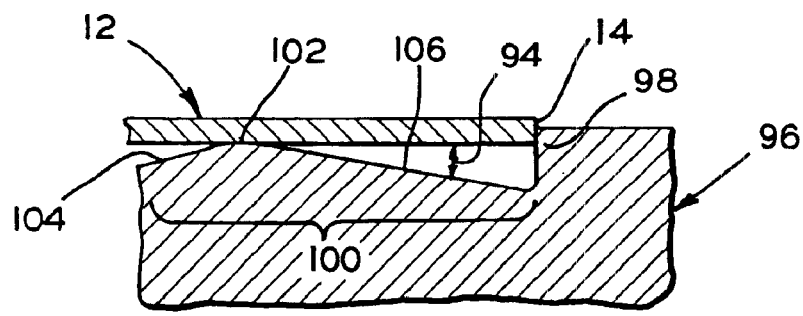
FIG. 12 is a schematic cross-sectional view in elevation of a portion of the drive shaft and a portion of the end fitting illustrating detail of a particular embodiment of the invention.

The axial location of the driveshaft tube 12 can be critical for different tubes and different shapes of the outside of the end fitting. It can be seen from FIG. 8 that the end 14 of the driveshaft tube 12 is generally axially aligned with the end 90 of the conductor strips gases surrounding. As shown in FIG. 11, however, when the end fitting outer surface is cylindrical as is outer surface 44D, the optimum position of the end 14 of the driveshaft tube 12 is in alignment with the approximate mid-point 92 of the conductor strips gases surrounding, rather than at the end 90 of the conductor strips gases surrounding. This is because in order to make good quality welded joints by magnetic pulse welding it is necessary to orient or align the two workpieces (i.e., the driveshaft and the end fitting) at a slight angle to each other, on the order of 5 to 15 degrees, as shown in FIG. 12. This angle between the surfaces is provided to accommodate the nonuniform acceleration of the drive shaft tube 12 toward the end fitting during the welding process. In its initial state the driveshaft is cylindrical, and the free end 14 is located at the mid-point 92 of the conductor strips gases surrounding, as shown in FIG. 11. Usually distribution of the magnetic field along the axial length of the coil results in a maximum magnetic field strength at the midpoint 92 of the coil. Owing to the magnetic field maximum at the mid-point 92, the free end 14 achieves a higher impact velocity than any other part of the driveshaft 12. As a result of the free end 14 being positioned at the axial maximum of the magnetic forces, the free end is the first part of the driveshaft to strike the end fitting surface. This non-uniform impact of one part of the driveshaft (i.e., end 14), rather than the impact of the whole driveshaft surface at once, produces a strong weld.

A particularly beneficial configuration is shown in FIG. 12. Angle 94 is the angle between the driveshaft 12 and the end fitting 96. This angle between the driveshaft and the end fitting is beneficial because it provides a nonuniform impact of the driveshaft against the end fitting. The end fitting 96 is provided with a shoulder or annular step 98 which acts as a stop or locator with respect to the end 14 of the driveshaft 12. The inner surface 100 of the end fitting 96 has three distinct surface portions. The first surface portion is the generally cylindrical portion 102, which generally contacts the driveshaft wall and serves to center the end fitting 96 within the driveshaft tube 12. The axial outer end surface portion 104 of the end fitting inner surface 100 is tapered radially inwardly to facilitate insertion of the end fitting 96 into the driveshaft tube 12. The axial inner end surface portion 106 is tapered radially inwardly with respect to the driveshaft tube 12, resulting in a spacing between the driveshaft tube 12 and the inner end surface portion 106. This spacing enables the driveshaft tube wall to develop sufficient velocity during the welding process to produce an effective weld upon impact.

As shown in FIG. 13, in a specific embodiment of the invention, the driveshaft tube 12 and end fitting 110 are positioned within the inductor 46. A locator clamp 112 is fixed to the driveshaft 12, and the axial movement of the driveshaft 12 into the inductor 46 is limited by the abutment or contact of the locator clamp 112 with the limitator or stop 114, which is fixed with respect to the inductor 46.

A locator fixture 116 is provided for the end fitting 110. Fixture 116 has an annular locator ring 118 that comes into contact with annular bushing 120 for a positive, predetermined axial positioning of the end fitting 110 with respect to the inductor 46. The annular insulator bushing 120 is fixed with respect to the inductor 46. In addition to axially fixing the penetration of the end fitting 110 into the inductor 46, the locator fixture 116 also provides radial centering of the end fitting with respect to the inductor and the driveshaft tube. The annular ring 118 is preferably provided with an axial slot and an adjustment member, such as a set screw 122, to enable the annular locator ring 118 to be adjustably tied or connected to the locator fixture 116. The locator fixture 116 is fixedly connected to the end fitting 110 by end fitting connection 124. A conical grip 126 is provided to ensure proper centering of the driveshaft tube 12 in the inductor 46.

EXAMPLE

In an example of a successful operation, the power source 70 provides a steady voltage of about 5,000 volts maximum, and the capacitor bank has 24 capacitors in parallel, each having a capacitance of 350 μF. at a proof voltage of 5,000 volts, for a total capacitance of 8400 μF. The voltage across the gap 68 is allowed to rise to a level of about 3500 volts before the arc discharge was initiated. The current flowing through the inductor is preferably greater than about one million amps, and typically about 1.3 million amps. The flow of current through the inductor 46 creates a magnetic field of about 30 Tesla. This causes the driveshaft to move radially inwardly into contact with the tube yoke with a velocity sufficient to cause a permanent weld.

Figure 14:
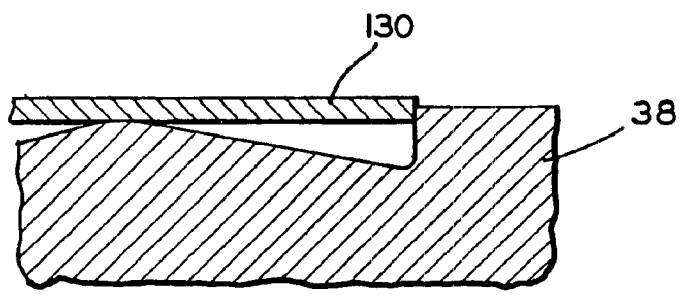
FIGS. 14–16 are schematic cross-sectional views in elevation of a portion of the drive shaft and a portion of the end fitting illustrating the application of a very thin layer of an intermediate sleeve of transition material.
Figure 15:
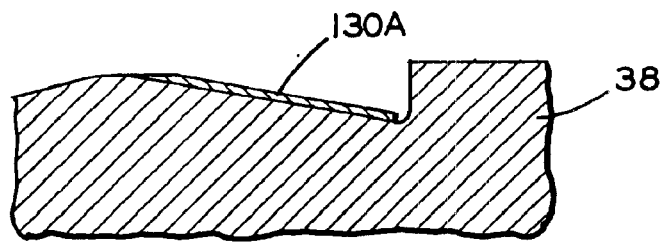
Figure 16:
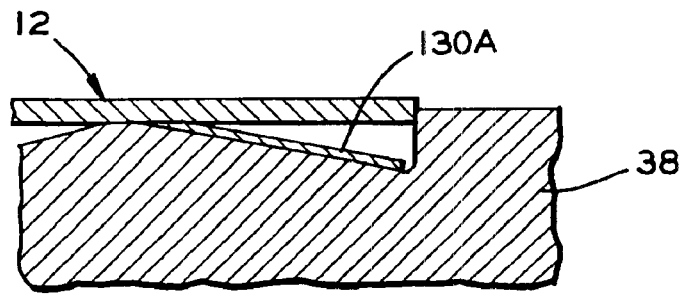

FIGS. 14–16 show a preferred method for using a transition material. This transition material can be any suitable material for enhancing the bond between a driveshaft of a strong aluminum alloy and an end fitting of another material, such as steel. A preferred transition material is a soft metal aluminum alloy, such as 1100. A blank or segment of transition material in the shape of a collar 130 is first positioned adjacent tube yoke neck, as shown in FIG. 14. Then the collar 130 is welded to the tube yoke neck using MPW. Then the welded collar 130 is turned or shaved off to a very thin layer 130A, as shown in FIG. 15. The turning can be accomplished by any suitable tuning device. It is to be understood that any applicable machining process can be used to reduce the thickness of the collar. The thinness of the layer 130A contributes to the strength of the ultimate bond between the driveshaft and the end fitting. Preferably, the thin layer 130A of transition material has a thickness within the range of from about 0.3 to about 1.0 mm. After the transition layer has been turned to reduce its thickness, the driveshaft 12 can be welded to the transition material 130A, as shown in FIG. 16.

It would seem preferable to apply a thin layer 130A to the tube yoke neck 38 rather than the thicker layer 130 which requires turning to reduce its thickness. However, a thin layer of transition material cannot be applied using energy at the same frequency used for applying a relatively thick layer. Applying a thin layer 130A with magnetic pulse welding requires a welding apparatus capable of discharging its current at a frequency (approximately 20 kHz or higher) significantly higher than the frequency (approximately 10 kHz) required for welding typical metallic layers, such as transition layer 130, or the driveshaft 12. In order to avoid the necessity of using two separate machines, a thicker layer 130 is applied and then it is turned to obtain the desired thin layer 130A. Thus, it can be seen that the improvement in bond strength, gained by using a thin layer 130A of transition material, is obtained only upon paying the price of the extra burden of using two welding machines, or upon undertaking the extra fabrication step of turning a thicker layer to obtain the desired thin layer.

It is to be understood that the thin layer of transition material can also be applied by a galvanic process or by a metallic spraying process.

Figure 17:
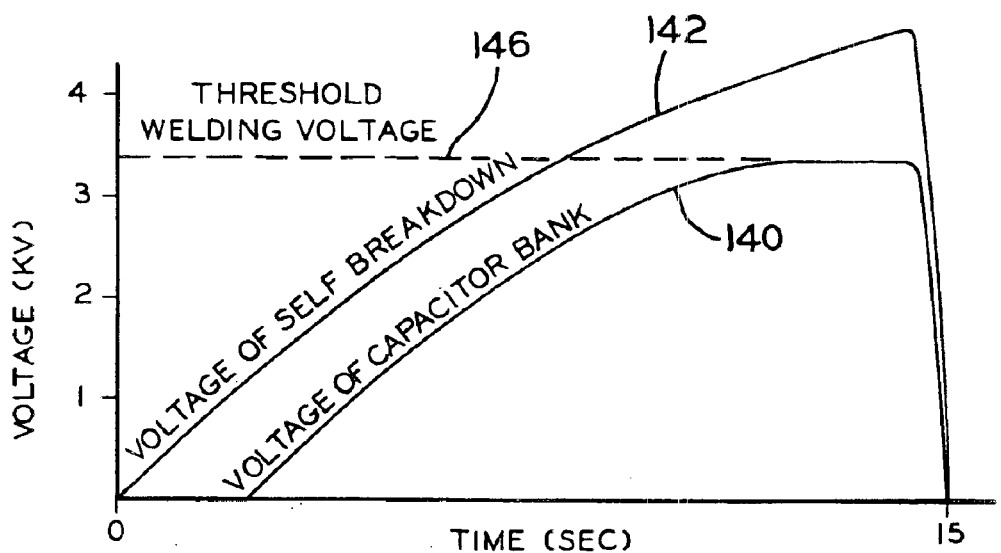
FIG. 17 is a graph showing the buildup over time of the voltage of self breakdown and the buildup of the voltage charge in the capacitor bank.
Figure 18:
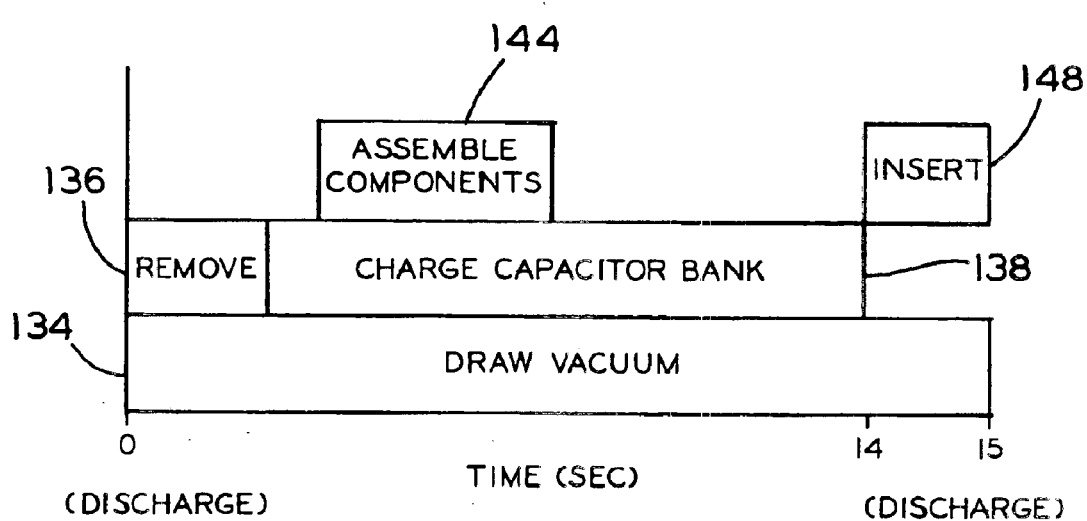
FIG. 18 is a timeline illustrating the sequence of steps in magnetic pulse welding according to the method of the invention.

FIGS. 17 and 18 illustrate the timing of the various process steps during a representative MPW welding cycle of the invention. For purposes of illustration the welding cycle has a 15 second period. It is to be understood that FIGS. 17 and 18 merely represent one possible timing scheme, and numerous other timing and processing designs can be used with the invention. As soon as the voltage is discharged from a previous cycle, the new cycle begins. The vacuum pump, not shown, runs continuously, and staring at the beginning of the cycle the vacuum is drawn, thereby continuously decreasing the air pressure surrounding the discharge switch 65, as indicated by time bar 134 in FIG. 18.

During the first second or few seconds of the cycle, the driveshaft components welded in the previous cycle are removed from the welding apparatus, as indicated by time bar 136. At approximately one second into the cycle, the charging circuit switch 74 is closed to supply voltage to the capacitor bank 64, as shown in FIG. 1, and as indicated by time bar 138 in FIG. 18. As can be seen in FIG. 17, the delay in the start of the charging of the capacitor bank means that the voltage of the capacitor bank 64, as indicated by curve 140, is lower than the voltage of self breakdown 142. The self breakdown voltage is that voltage which is sufficient to overcome the insulation associated with the apparatus, giving rise to a sudden, unwanted discharge of voltage. The self discharge voltage is the level at which the electrical insulation is no longer sufficient to prevent discharge. To avoid premature discharge of the voltage, the charging of the capacitor bank is purposely carried out at a rate to maintain a difference or gap between the voltage of self breakdown and the voltage of the capacitor bank. Preferably the difference in voltage between the self breakdown voltage of the discharge switch and the voltage of the capacitor is maintained at a level of at least 200 volts during the charging of the capacitor.

While the capacitor bank 64 is being charged, the components to be welded are assembled and made ready to be inserted into the inductor 46, as indicated by time bar 144. After the voltage of the capacitor exceeds the minimum or threshold voltage, indicated by curve 146 in FIG. 17, then the charging of the capacitor bank 64 is concluded. In the representative cycle depicted in FIGS. 17 and 18, this occurs at approximately the 14 second mark. The threshold voltage is shown at about 3,500 volts in FIG. 17, and is expected to be within the range of from about 3,000 to about 4,000 volts. After the threshold voltage is reached, the assembled driveshaft and end fitting components are inserted into the inductor 46, as indicated by time bar 148. After the assembled components are inserted into the inductor, the voltage in the capacitor bank 64 is discharged across the gap 68 in the discharge switch 65, and the assembled components are welded. The assembly, insertion into the inductor, and removal from the inductor can be completed either manually or by an automatic apparatus, not shown, such as a robot. By delaying the insertion of the assembled components until the capacitor bank is fully charged, the possibility of prematurely discharging the capacitor bank and permanently ringing the driveshaft is precluded.

Figures 19, 20:
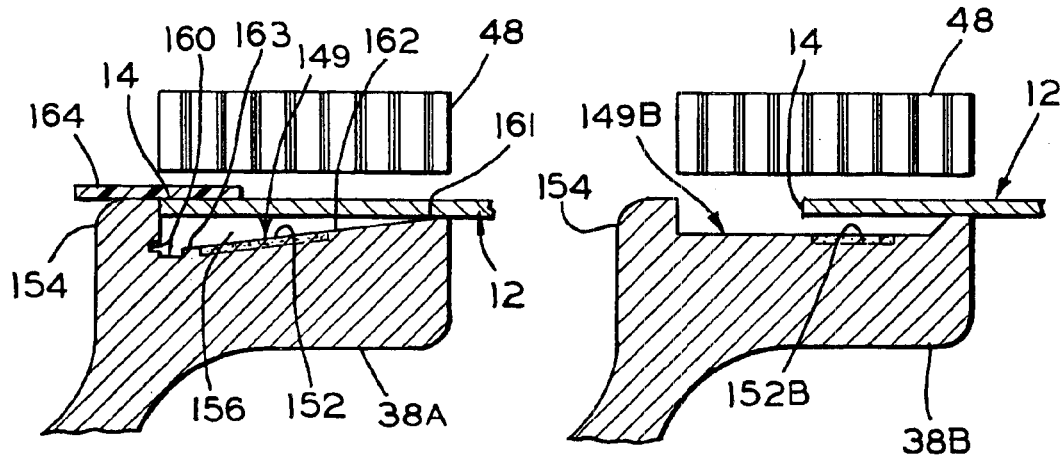
FIG. 19 is a schematic cross-sectional view illustrating a gap for collecting airborne contaminants, and a barrier for preventing outflow of contaminants into the remainder of the inductor.
FIG. 20 is a schematic cross-sectional view showing the welding of a end fitting with a cylindrical surface rather than a sloped, frustoconical surface.

As shown in FIG. 19, a portion of the welding surface 149 of the neck 38A of the yoke 24 is the prime welding area 152. The prime welding area is typically made of the same material as the rest of the welding surface 149 of the end fitting, but the prime welding area 152 is the zone where the maximum strength of the weld occurs. This is determined by various factors, such as the spacing or gap between the drive shaft 12 and the welding surface 149, and such as the angle and impact of the contact between the driveshaft and the welding surface 149. While other areas of the welding surface may also be welded to the driveshaft, the prime welding area 152 provides the best possible adherence of the driveshaft 12 to the yoke 24.

As described above, the welding surfaces usually have oxide films and various contaminants. To obtain a strong joint or weld, it is necessary to clean this contamination from the welding surfaces. In the process of MPW in the area where the surfaces collide with each other at an angle and at high velocity, the resulting cumulative jet includes material from the collision surfaces. This material carried with the cumulative jet acts to clean the welding surfaces. It is desirable to contain these contaminants and pressurized air to prevent them from escaping from the cavity 156. Otherwise, the contaminants could accumulate on various elements of the inductor apparatus, and the force of the contaminants and pressurized air escaping from the cavity 156 would degrade the central insulator 58 (shown in FIG. 1). This process can result in the breakdown of the inductor coil.

Figures 21, 22:
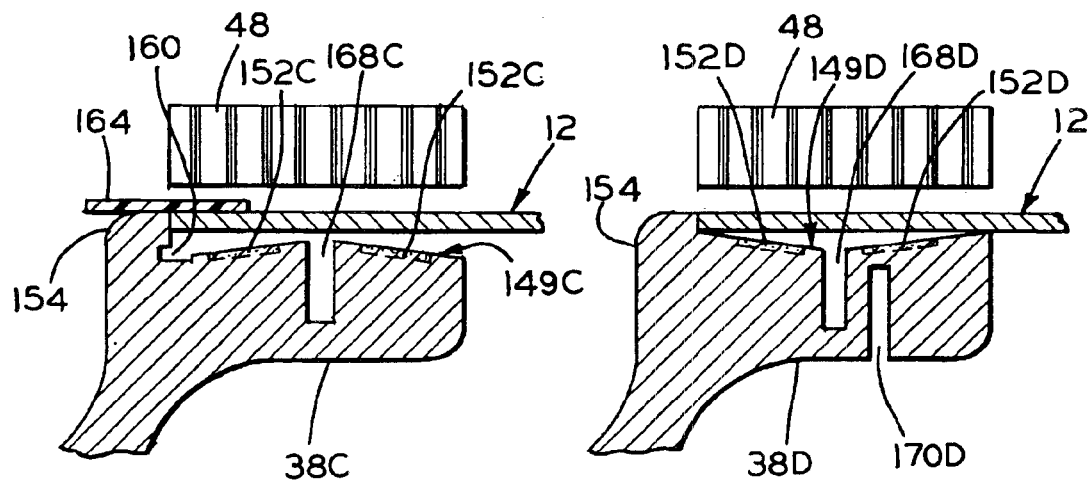
FIG. 21 is an illustration showing an end fitting having a convex surface and a slit for improved flexibility.
FIG. 22 is an illustration showing an end fitting having a concave surface and slits for improved flexibility.

FIGS. 19–25 show different configurations for welding, each one providing different advantages. The configuration selected for any particular welding operation well depend on such factors as the yoke shape, the required strength of the materials and of the bond, the tube diameter, and the materials to be used As shown in FIGS. 19, 21 and 22, the welding surface 149 need not be cylindrical, but can be on an angle (frustoconical), thereby defining, with yoke shoulder 154, a cavity 156. At the end of the cavity 156, there is provided one or more pockets 160 which act as collection points or depositories for contaminants generated during the welding process. The presence of a pocket 160 in the end yoke enables a substantial portion of the contaminants to be held in without escaping to the atmosphere, thereby promoting the efficiency of the system. Where the welding surface 149 is frustoconical, the welding process causes the driveshaft tube 12 to contact the welding surface 149 first at an initial contact portion 161 of the welding surface, then progressively along an intermediate portion 162 of the welding surface, and finally at an end portion 163 of the welding surface. The pocket is positioned near the end portion 163 of the welding surface to collect the contaminants and pressurized air. The pocket 160 can be an annular slit or notch, as shown in FIG. 19, and can be positioned on the shoulder 154, or on the welding surface 149, or on both the shoulder and the welding surface, as shown in FIG. 19. The pocket 160 can be of any suitable shape for collecting the contaminants and pressurized air.

Another aspect of the welding process of the invention is the use of a contamination shield, such as annular plastic shield 164. Even though the end 14 of the driveshaft tube is generally axially aligned with the shoulder 154, excessive contaminants can be emitted from the cavity 156 during the welding process. The shield 164 helps prevent excessive contaminants and pressurized air from escaping the cavity 156. As explained above, the impact of the contaminants and pressurized air forcefully ejected from the cavity 156 can damage the central insulator 58. A suitable material for the shield 164 is a polyethylene film having a thickness of about 0.3 to about 0.5 mm. Preferably, the shield 164 is a single-use protective envelope located where the end 14 of the driveshaft 12 meets the shoulder 154 of the fitting neck 38A to prevent escape of contaminating gases, vapors and particulate matter during the welding process.

As shown in FIG. 20, where the end fitting welding surface 149B is cylindrical rather than frustoconical, the end 14 of the driveshaft 12 is positioned near the midpoint of the inductor coil 48. This is similar to the configuration shown in FIG. 11. The prime welding area 152B is shown as being positioned adjacent the end 14 of the driveshaft 12. A particular advantage of the embodiment of the invention shown in FIG. 20 is that since the end 14 contacts the welding surface first, the wave or flow of contaminants and pressurized gases is contained, and cannot escape.

As shown in FIG. 21, the welding surface is a convex welding surface 149C having two prime welding areas 152C. Likewise, as shown in FIG. 22, the welding surface 149D can be concave, with two prime welding areas 152D. The advantage of having two surfaces with bonds between the welded parts is that both bonds can bear the brunt of the torque forces transmitted between the driveshaft 12 and the end fitting 38C, 38D.

An additional feature of the invention is the use of a slot 168C in the end fitting to increase the flexibility of the end fitting during operation of the welded yoke and driveshaft in a universal joint, as shown in FIG. 21. The slot 168C is particularly advantageous where there are two prime welding areas, such as shown in FIGS. 21 and 22, because the slot gives the yoke the ability to deform slightly when necessary, thereby greatly increasing its usefulness as a component of a driveshaft assembly. Typically, driveshaft tubes are on the order of 2–3 mm in thickness, whereas the yoke typically has a much greater thickness, e.g., up to 8–10 mm or more. Therefore, when there are two prime welding areas, the flexibility gained by the use of the slot allows both of the welded connections to be stressed, thereby distributing the forces and producing a stronger overall weld.

The slot 168C can be of any shape, such as the annular shape shown in FIG. 21. Preferably, the slot has an orientation generally normal to the welding surface, as shown, although other orientations are possible. The slot 168D in FIG. 22 improves flexibility of the end fitting in the same manner as described in connection with slot 168C shown in FIG. 21. Additionally, a second slot 170D can also be provided on the inside surface of the end fitting 38D. A preferred slot has a width within the range of from about 2 to about 5 mm, and a depth within the range of from about 1.0 to about 10 mm. The actual dimensions of the slot must be determined by the flexibility requirements of the yoke.

Figure 23:
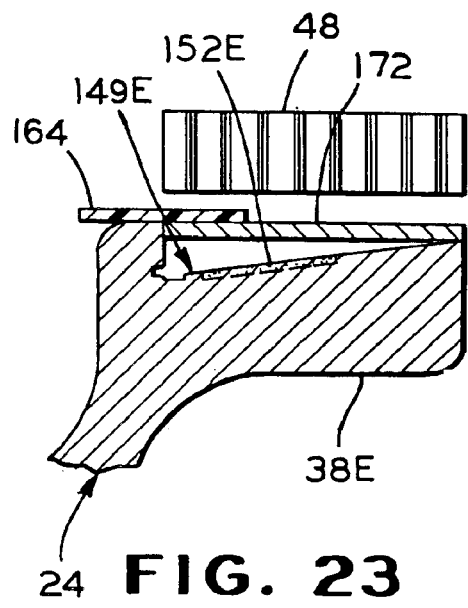
FIGS. 23 and 24 are schematic cross-sectional views in elevation of another embodiment of the drive shaft, showing the addition of a thin transition layer.
Figure 24:
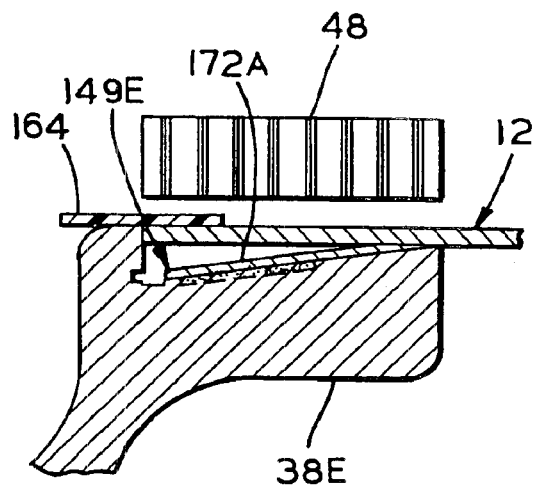

An additional feature of the invention is shown in FIGS. 23 and 24, where the transition material 130 is used in conjunction with a sloped or frustoconical welding surface 149E on neck 38E, in a manner similar to that described above in connection with FIGS. 14–16. The transition material 172 is welded to the welding surface 149E, and then turned to form a thin layer 172A of transition material, as shown in FIG. 24. The driveshaft 12 is then welded to the transition layer 172A. The shield 164 can be used with either or both of the welding of the transition material and the driveshaft.

Figure 25:
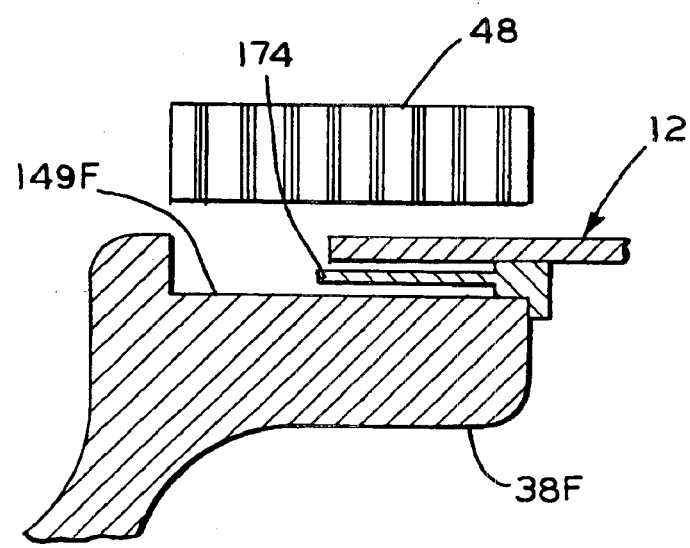
FIG. 25 is a schematic cross-sectional view in elevation of another embodiment showing the welding of the driveshaft in a one-step process with a layer of transition material.

As shown in FIG. 25, the welding surface 149F is cylindrical, and the transition material 174 is positioned between the driveshaft 12 and the welding surface 149F of the neck 38F. The MPW welding process of the invention welds the transition material 174 to the welding surface 149F and at the same time welds the driveshaft 12 to the transition material 174. This enables the accomplishment of a two-step welding process in one step.

The principle and mode of operation of this invention have been explained and illustrated in its preferred embodiment. However, it must be understood that this invention may be practiced otherwise than as specifically explained and illustrated without departing from its spirit or scope.

What is claimed is:

1. A method of securing components of a vehicular driveshaft assembly comprising:

providing a driveshaft tube having an open end;

providing an inductor around the driveshaft tube, wherein the inductor has an approximate mid-point, and wherein the end of the driveshaft tube is in alignment with the approximate mid-point of the inductor;

providing an end fitting;

disposing the end fitting into the open end of the driveshaft tube; and energizing the inductor to generate a magnetic field for collapsing the driveshaft tube about the end fitting at a velocity sufficient to magnetic pulse weld the driveshaft tube and end fitting to each other.

2. A method of securing components of a vehicular driveshaft assembly comprising:

providing an end fitting;

providing a driveshaft tube having an open end;

providing an inductor around the end of the driveshaft tube;

providing a locator fixture positioned at the open end of the driveshaft tube, the locator fixture being configured to establish a predetermined axial position of the end fitting with respect to the drivesbaft tube, and the locator fixture being configured to establish radial centering of the end fitting with respect to the driveshaft tube;

disposing the end fitting into the open end of the driveshaft tube, thereby establishing the predetermined axial position of the end fitting with respect to the driveshaft tube and the radial centering of the end fitting with respect to the driveshaft tube; and energizing the inductor to generate a magnetic field for collapsing the driveshaft tube about the end fitting at a velocity sufficient to magnetic pulse weld the driveshaft tube and end fitting to each other.

3. A method of securing components of a vehicular driveshaft assembly comprising:

providing a driveshaft tube having an open end;

providing an end fitting having a shoulder;

disposing the end fitting into the open end of the driveshaft tube, with the end fitting intersecting the shoulder;

providing an inductor around the driveshaft tube;

providing a contamination shield about the shoulder, positioned around and spanning the intersection of the shoulder and the end of the driveshaft tube; and energizing the inductor to generate a magnetic field for collapsing the driveshaft tube about the end fitting at a velocity sufficient to magnetic pulse weld the driveshaft tube and end fitting to each other.

4. The method of claim 3 wherein the contamination shield is of a plastic material.

5. The method of claim 3 wherein the contamination shield is a polyethylene film.

6. The method of claim 3 wherein the contamination shield has a thickness within the range of from about 0.5 to about 5 mm.

7. A method of securing components of a vehicular driveshaft assembly comprising:

providing a driveshaft tube having an open end;

providing an inductor around the driveshaft tube;

providing an end fitting having two axially spaced apart annular prime welding surfaces separated by an annular slot;

disposing the end fitting into the open end of the driveshaft tube; and energizing the inductor to generate a magnetic field for collapsing the driveshaft tube about the end fitting at a velocity sufficient to magnetic pulse weld the driveshaft tube and end fitting to each other, wherein the weld comprises two axially spaced apart welds.

8. The method of claim 7 wherein the two axially spaced apart annular prime welding surfaces define a convex welding surface.

9. The method of claim 7 wherein the two axially spaced apart annular prime welding surfaces define a concave welding surface.

10. A method of securing components of a vehicular driveshaft assembly comprising:

providing a driveshaft tube having an open end;

providing an inductor around the driveshaft tube;

providing an end fitting having an outer surface and an inner surface, wherein the inner surface has an annular slot for improving the flexibility of the end fitting;

disposing the end fitting into the open end of the driveshaft tube; and energizing the inductor to generate a magnetic field for collapsing the driveshaft tube about the end fitting at a velocity sufficient to magnetic pulse weld the driveshaft tube and end fitting to each other.

11. The method of claim 10 wherein annular slot has a width within the range of from about 2 to about 5 mm.

12. The method of claim 10 wherein annular slot has a depth within the range of from about 1.0 to about 10 mm.

* * * * *